US011800384B2

(12) United States Patent
Viorel et al.

(10) Patent No.: US 11,800,384 B2
(45) Date of Patent: Oct. 24, 2023

(54) MULTI-INPUT, MULTI-OUTPUT (MIMO) EMULATED CHANNEL MEASUREMENTS AND EVALUATION

(71) Applicant: CABLE TELEVISION LABORATORIES, INC., Louisville, CO (US)

(72) Inventors: Dorin Gheorghe Viorel, Erie, CO (US); Rakesh Taori, McKinney, TX (US)

(73) Assignee: Cable Television Laboratories, Inc., Louisville, CO (US)

( * ) Notice: Subject to any disclaimer, the term of this patent is extended or adjusted under 35 U.S.C. 154(b) by 263 days.

(21) Appl. No.: 17/389,912

(22) Filed: Jul. 30, 2021

(65) Prior Publication Data

US 2022/0060916 A1    Feb. 24, 2022

Related U.S. Application Data

(60) Provisional application No. 63/058,634, filed on Jul. 30, 2020.

(51) Int. Cl.
*H04W 24/00*        (2009.01)
*H04W 24/06*        (2009.01)
*H04B 7/0413*       (2017.01)

(52) U.S. Cl.
CPC .......... *H04W 24/06* (2013.01); *H04B 7/0413* (2013.01)

(58) Field of Classification Search
CPC .............. H04B 7/0413; H04B 17/3912; H04L 25/0224; H04L 25/0226; H04W 24/06; H04W 24/08
See application file for complete search history.

(56) References Cited

U.S. PATENT DOCUMENTS

| 10,433,198 B2 * | 10/2019 | Kobele | ............... H04L 25/0202 |
| 2016/0212641 A1 * | 7/2016 | Kong | .................. H04B 17/0087 |

FOREIGN PATENT DOCUMENTS

| WO | WO 2009/072775 | * | 6/2009 |
| WO | WO 2015/018039 | * | 2/2015 |

OTHER PUBLICATIONS

Chen et al., English translation of WO 2015/018039, 27 pages, 2015.*

(Continued)

*Primary Examiner* — Frank Duong
(74) *Attorney, Agent, or Firm* — Polsinelli PC

(57) ABSTRACT

A system or method for emulating wireless channels, including a multi-input, multi-output (MIMO) channel, for evaluation of a wireless system is provided. To emulate the wireless channel, a series of in-field measurements of the wireless signal may be obtained and used to configure one or more communication devices for the signal evaluation. A virtual circular antenna may be controlled to obtain a first set of measurements based on a first trigger signal and a second set of measurements based on a second trigger signal delayed from the first trigger signal. The second set of measurements of the wireless signal, in addition to the first set of measurements, may approximate or may be an equivalent of the MIMO channel. The obtained or derived characteristics of the in-field wireless signal may be used to emulate a channel in a laboratory setting to evaluate one or more aspects of a wireless communication system.

20 Claims, 9 Drawing Sheets

(56) References Cited

OTHER PUBLICATIONS

Schmieder et al., Measurement and Characterization of an Indoor Industrial Environment at 3.7 and 28 GHz, IEEE, 5 pages, 2020.*

Schmieder et al., Directional Wideband Channel Measurements at 28 GHz in an Industrial Environment, IEEE, 6 pages, 2019.*

Bas et al., Real-Time Millimeter-Wave MIMO Channel Sounder for Dynamic Directional Measurements, arXiv, 12 pages, Jul. 31, 2018.*

Nguyen et al., Instantaneous Direction of Arrival Measurements in Mobile Radio Channels Using Virtual Circular Array Antennas, IEEE, 7 pages, 2016.*

* cited by examiner

MULTI-INPUT, MULTI-OUTPUT (MIMO) EMULATED CHANNEL MEASUREMENTS AND EVALUATION

CROSS-REFERENCE TO RELATED APPLICATION

This application is related to and claims priority under 35 U.S.C. § 119(e) from U.S. Patent Application No. 63/058,634, filed Jul. 30, 2020 entitled "EMULATED CHANNEL MEASUREMENTS AND NR MIMO EVALUATION", the entire contents of both of which are incorporated herein by reference for all purposes.

TECHNICAL FIELD

Embodiments of the present invention generally relate to systems and methods for implementing a wireless communication network, and more specifically for systems and methods for emulating multi-input, multi-output (MIMO) wireless channels for evaluation of a wireless system.

BACKGROUND

Cellular telephony continues to evolve at a rapid pace. Cellular telephone networks currently exist in a variety of forms and operate using a variety of modulations, signaling techniques, and protocols, such as those found in 5G and LTE networks (5th Generation of mobile telecommunications technology and Long Term Evolution, respectively). As consumers require more capacity, the networks usually evolve. For example, some carriers, or Mobile Network Operators (MNOs), employ a 5G or LTE protocol because MNOs needed faster networks to satiate the increased demand for data and voice.

The rapid evolution of such cellular networks often requires extensive testing of proposed equipment, parameters or settings of the equipment, and/or signaling protocols before deployment into the network to ensure a reliable and effective wireless network. Such testing may occur in a laboratory setting (such as in an anechoic chamber) and/or in the field. However, while laboratory testing may be controllable, such testing is often time-consuming and may not apply effectively to real-world conditions. In contrast, in-field testing may be more relevant to real-world conditions, but is also often rife with inaccuracies due to the number of uncontrollable variables present in the outside environment. These issues are exacerbated as wireless technology becomes faster and more precise, often resulting in ineffective ways of testing new equipment and signaling protocols.

It is with these observations in mind, among other, that aspects of the present disclosure were conceived.

SUMMARY

One aspect of the present disclosure relates to a method for emulating a wireless channel for evaluation of a wireless signal. The method may include the operations of transmitting a first trigger signal to obtain a first set of measurements of a wireless signal received at a rotating virtual circular antenna (VCA), the first trigger signal corresponding to a first position of the VCA and transmitting a second trigger signal to obtain a second set of measurements of the wireless signal received at the VCA, the second trigger signal corresponding to a second position of the VCA different than the first position. The method may also include the operations of configuring, based on the first set of measurements, one or more output port parameters of a first channel emulator and, based on the second set of measurements, one or more output port parameters of a second channel emulator and transmitting an evaluation wireless signal to the first channel emulator and the second channel emulator, the output of the first channel emulator and the second channel emulator comprising an emulated multi-input, multi-output (MIMO) wireless channel.

Another aspect of the present disclosure relates to a system for emulating a wireless channel for evaluation of a wireless signal. In one implementation, the system may include a signal generator emitting a wireless communication signal, a virtual circular antenna (VCA) receiving the emitted wireless communication signal, a signal analyzer measuring at least one characteristic of the wireless communication signal, and a computing device. The computing device may include one or more processors and a non-transitory storage device including computer executable instructions that, when executed by the one or more processors, cause the one or more processors to execute one or more operations. Such operations may include transmitting a first trigger signal to obtain a first set of measurements of the wireless communication signal received at the VCA, the first trigger signal corresponding to a first position of the VCA, transmitting a second trigger signal to obtain a second set of measurements of the wireless communication signal received at the VCA, the second trigger signal corresponding to a second position of the VCA different than the first position, and configuring, based on the first set of measurements, one or more output port parameters of a first channel emulator and, based on the second set of measurements, one or more output port parameters of a second channel emulator, wherein an output of the first channel emulator and an output of the second channel emulator comprise an emulated multi-input, multi-output (MIMO) wireless channel.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
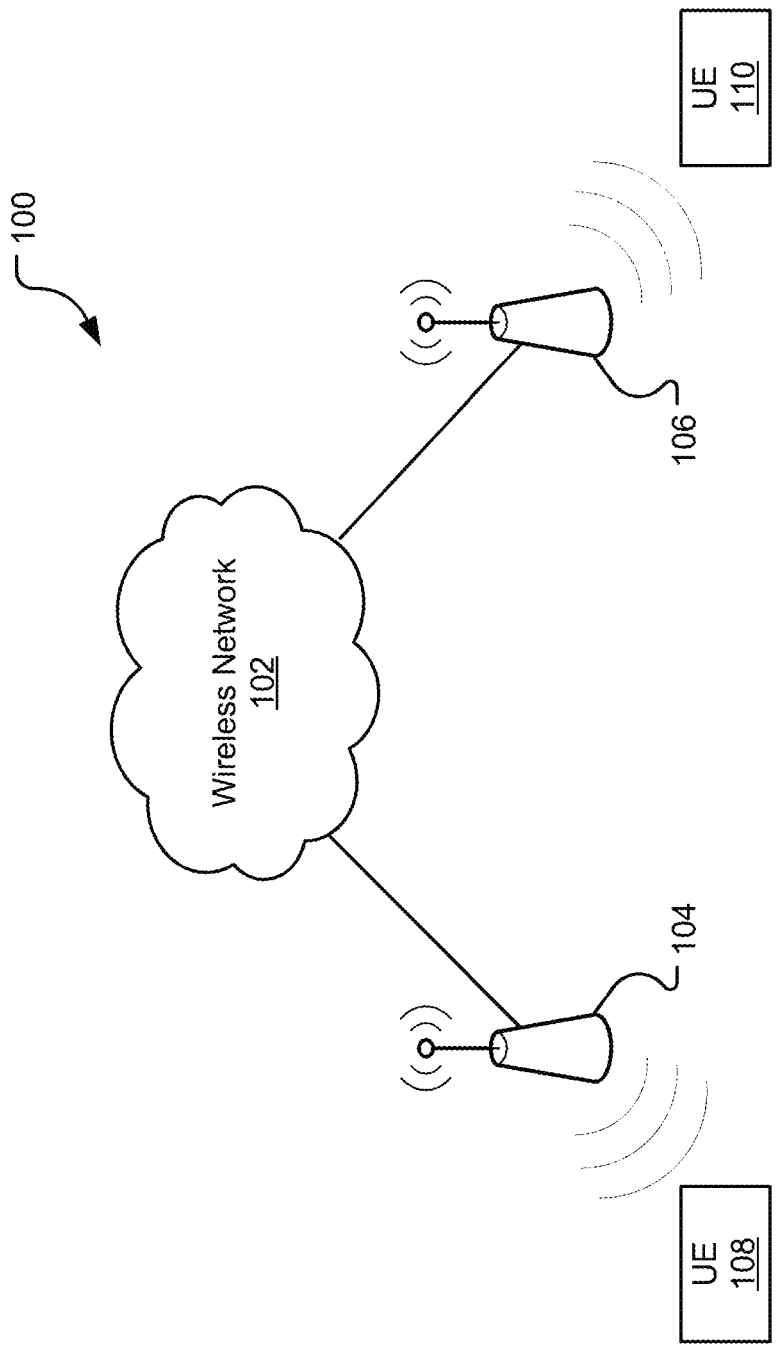
FIG. 1 is a schematic diagram illustrating an exemplary wireless telecommunications system utilizing multi-input, multi-output (MIMO) propagation in accordance with one embodiment.

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Aspects of the present disclosure involve apparatus, systems, methods, and the like, for emulating wireless channels for evaluation of a wireless system. In one implementation, the emulated wireless channel may be a multi-input, multi-output (MIMO) channel of a wireless signal. To emulate the wireless channel, a series of in-field measurements of the wireless signal may be obtained and used to configure one or more communication devices for the signal evaluation. In particular, an in-field testing configuration of devices may be used to obtain one or more measurements of the wireless signal in an in-field environment, such as a such as an outside-to-inside (O2I) environment, an outside-to-outside (O2O) environment, etc. Components of the in-field testing configuration of devices may include a virtual circular antenna (VCA) array device in communication with a signal analyzer for obtaining wireless signal measurements. The VCA may be controlled to obtain a first set of measurements based on a first trigger signal. The first set of measurements may be used, in some instances, to configure one or more testing components to emulate a single-input, single-output (SISO) channel of the wireless signal. Further, the VCA may also be controlled to obtain a second set of measurements based on a second trigger signal. In some particular examples, the second trigger may be delayed from the first trigger signal by at least twice the wavelength of the wireless signal. The second set of measurements of the wireless signal, in addition to the first set of measurements, may approximate or may be an equivalent of a MIMO channel of the wireless signal. In another implementation, the one or more testing components may also include a second VCA and second signal analyzer that may also be controlled by the first and second trigger signals to obtain first and second measurements of the wireless signal. One or more characteristics of the wireless signal may be generated or derived from the obtained measurements, such as a power delay profile of the wireless signal. Through the use of the first and second measurements as controlled by the trigger signals, MIMO channel sounding characteristics of the wireless signal may be obtained during the in-field testing.

In addition, the obtained or derived characteristics of the in-field wireless signal may be used to emulate a SISO or MIMO channel in a laboratory setting to evaluate one or more aspects of a wireless communication system. For example, the power delay profile of a wireless signal obtained through the in-field testing configuration discussed above may be transformed into an input to one or more channel emulators of a laboratory testing configuration of devices. In particular, one or more output port parameters of a channel emulator or signal generator of a laboratory testing configuration may be based on the wireless signal characteristics obtained or determined from the in-field testing. By adjusting the parameters of the channel emulators, a SISO or MIMO channel may be emulated in a laboratory environment. Evaluation of the wireless signal, one or more wireless devices, and/or a wireless system may be conducted in the laboratory environment using the channel emulators. As such, an in-field wireless signal may be emulated in a laboratory environment for repeated and controllable evaluation of the wireless signal. Such emulation may include a MIMO channel of the wireless signal for an accurate, real-world evaluation of the wireless communication system.

FIG. 1 is a schematic diagram illustrating an exemplary wireless telecommunications system utilizing multi-input, multi-output (MIMO) propagation in accordance with one embodiment. The wireless telecommunications system 100 may include one or more wireless access points (WAPs) 104, 106. A WAP 104, 106 of the wireless communication system 100 may be any wireless transmitter/receiver device, including a wireless antenna configured to transmit and receive a wireless communication signal. The WAP 104, 106 may be communicatively coupled to a wireless network 102, such as a wireless telephony network or a wireless computing network, and receive and transmit wireless communications from the network such that the WAP is configured as a gateway or access to the wireless network. Generally, the WAP 104, 106 may be any system, apparatus, software, or combination thereof operable to maintain or otherwise support wireless communications, including data and voice, with subscribers to the wireless network 102 via a user equipment (UE) 108, 110. UEs may include any wireless device, such as but not limited to mobile handsets, cellphones, personal digital assistants, other mobile devices, and/or other wireless devices, through which the subscribers may access and interact with the wireless network 102. In one example, communications and/or data from a first UE 108 may be transmitted to a second UE 110 via the wireless network 102 and associated WAPs 104, 106. In this regard, the WAP 104, 106 may provide access to the wireless network 102 for one or more nearby UEs 108, 110 and may implement wireless communications via, for example, 2G, 3G, LTE, 5G, or the like.

Figure 2:
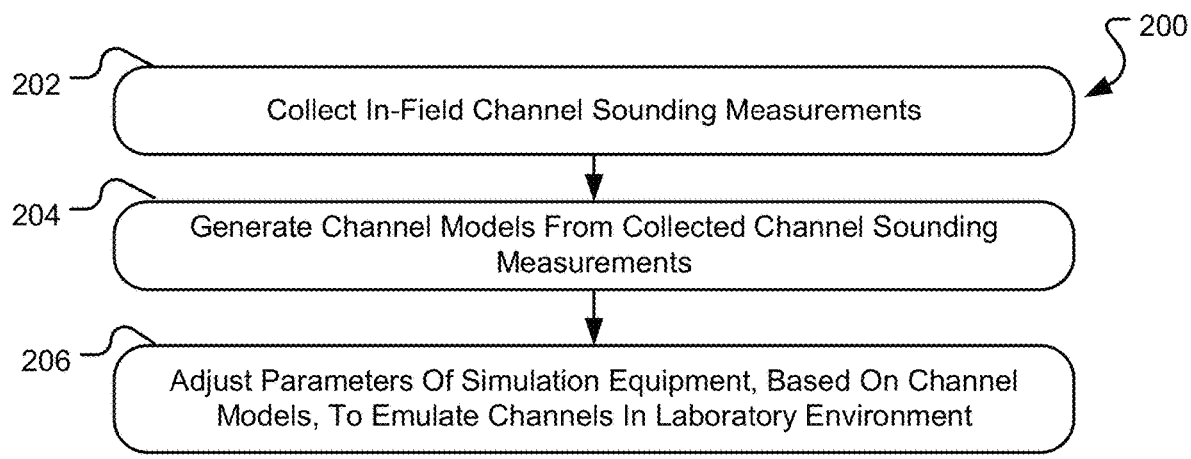
FIG. 2 is a flowchart illustrating a method for emulating a wireless communication channel based on in-field measurements for performance evaluation of the wireless communication channel in accordance with one embodiment.

As wireless networks continue to evolve and improve, testing of newly designed network equipment, parameters, and/or signaling protocols is performed to ensure a reliable and effective wireless network 102. However, as discussed above, several inefficiencies make testing or evaluation of wireless communications difficult, particularly replicating or emulating in-field conditions for conducting multiple evaluations of the wireless communications. FIG. 2 is a flowchart illustrating a method 200 for emulating a wireless communication channel based on in-field measurements for performance evaluation of the wireless communication channel in accordance with one embodiment. In one instance, the method 200 may be performed to emulate a multiple input, multiple output (MIMO) wireless or radio signal, although other types of wireless signals may also be emulated through the method of FIG. 2, such as single input, single output (SISO), multiple input, single output (MISO), single input, multiple output (SIMO) signals, and others. The method 200 may also apply to any type of wireless signal protocol or standard, such as those listed above in relation to FIG. 1. In general, the method 200 of FIG. 2 may provide for wireless channel emulation in a laboratory or other environment based on channel sounding measurements obtained from in-field environments or conditions. One or more of the operations of the method 200 may be executed by a computing device or technician operating a computing device, which may include execution of one or more software programs, one or more hardware components interconnected or otherwise configured to execute the operation, or a combination of both hardware and software components.

Beginning in operation 202, one or more channel sounding measurements may be obtained from an in-field test set-up. Channel sounding is a testing technique for measuring wireless signals in an environment that includes multiple propagation paths of the signal due to terrain variations and obstacles in the environment. Some wireless systems, also known as MIMO systems, exploit the multiple propagation path of the wireless signal to enhance the performance of a wireless network and devices. Channel sounding techniques, explained in more detail below, provide for measuring or processing of multi-dimensional wireless signals, in both time and space, received at an antenna due to terrain and obstacles causing multiple propagation paths through an environment. Such channel sounding techniques provide characteristics of a wireless signal based on measurements obtained at the antenna. However, because the in-field environment is typically dynamic, such channel sounding measurements may vary from test-to-test such that the channel sounding measurements may be unreliable over time.

In operation 204, one or more channel models may be generated from the collected channel sounding measurements. The channel models are built from the channel sounding measurements obtained during the in-field testing and are designed to emulate parameters or other characteristics of an in-field environment. In one implementation, the channel model may include parameters of a MIMO system signal of an in-field environment based on measurements obtained during one or more in-field tests. Other types of channel models may also be generated based on the collected channel sounding measurements, such as a SISO system wireless signal. In operation 206, one or more wireless network simulation devices may be adjusted or configured to emulate a wireless channel based on the channel sounding measurements obtained above. For example, the channel model for a MIMO system may be based on a power delay profile of the MIMO signal determined from one or more channel sounding measurements obtained during an in-field test. The power delay profile of the MIMO signal may be transformed into one or more parameters of a signal generator to emulate the MIMO channel in a laboratory environment. Such parameters may include one or more adjustable outputs of the signal generator to approximate the power delay profile of the measured MIMO signal or channel obtained from the in-field tests. In this manner, the MIMO channel may be emulated within the laboratory setting for additional testing in a reliable and repeatable fashion. The operations of the method 200 of FIG. 2 are described in more detail below.

Figure 3:
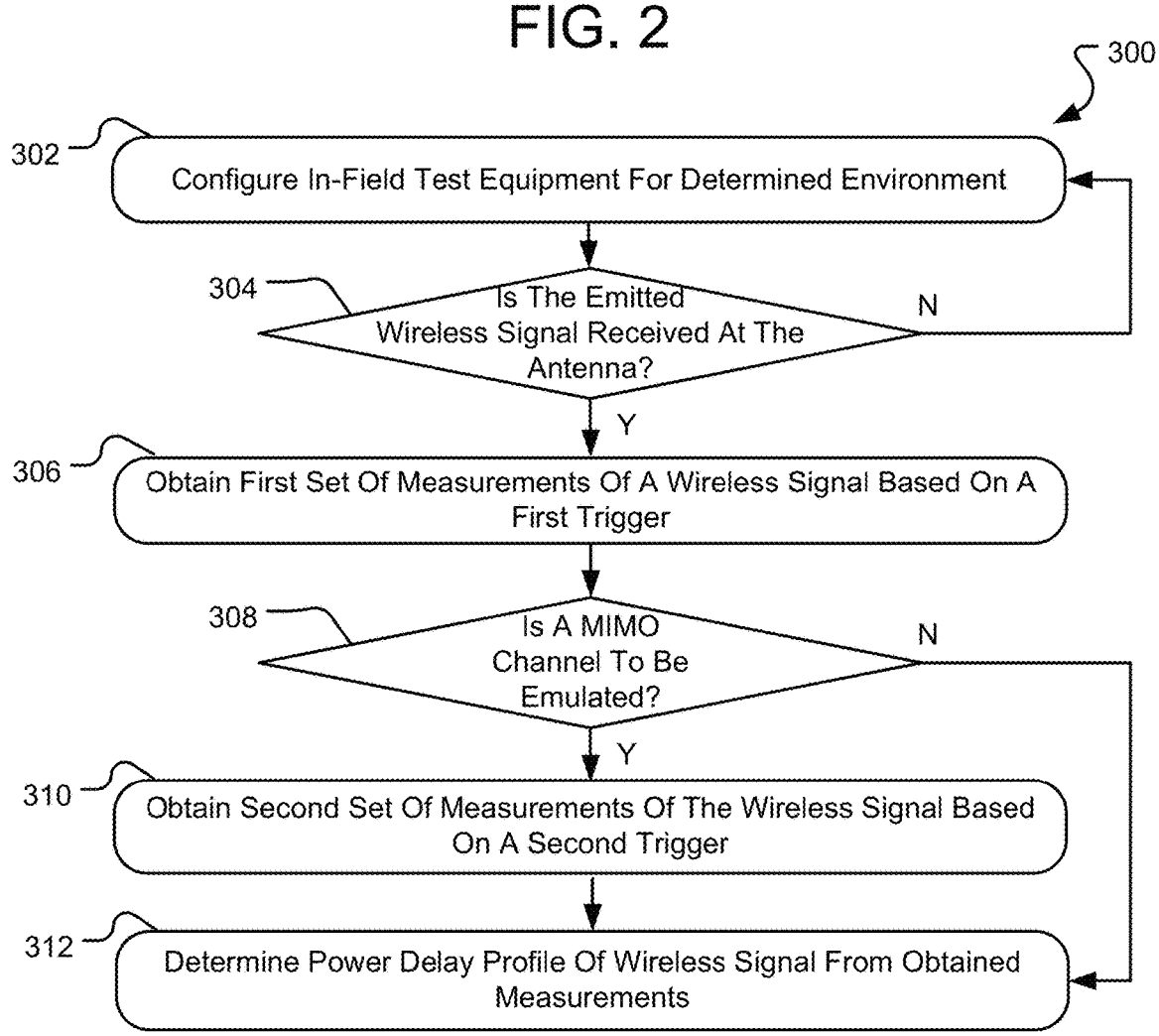
FIG. 3 is a flowchart illustrating a method for obtaining in-field channel sounding measurements of a wireless communications in accordance with one embodiment.

As described above, the method 200 for emulating in-field wireless channels in a laboratory environment may include collecting one or more in-field channel sounding measurements. In some instances, such channel sounding measurements may include MIMO wireless signals, although other types of wireless systems and signals are contemplated. FIG. 3 is a flowchart illustrating a method 300 for obtaining in-field channel sounding measurements of a wireless communications in accordance with one embodiment. Similar to above, one or more of the operations of the method 300 of FIG. 3 may be executed by a computing device or technician operating a computing device, which may include execution of one or more software programs, one or more hardware components interconnected or otherwise configured to execute the operation, or a combination of both hardware and software components.

Figure 4A:
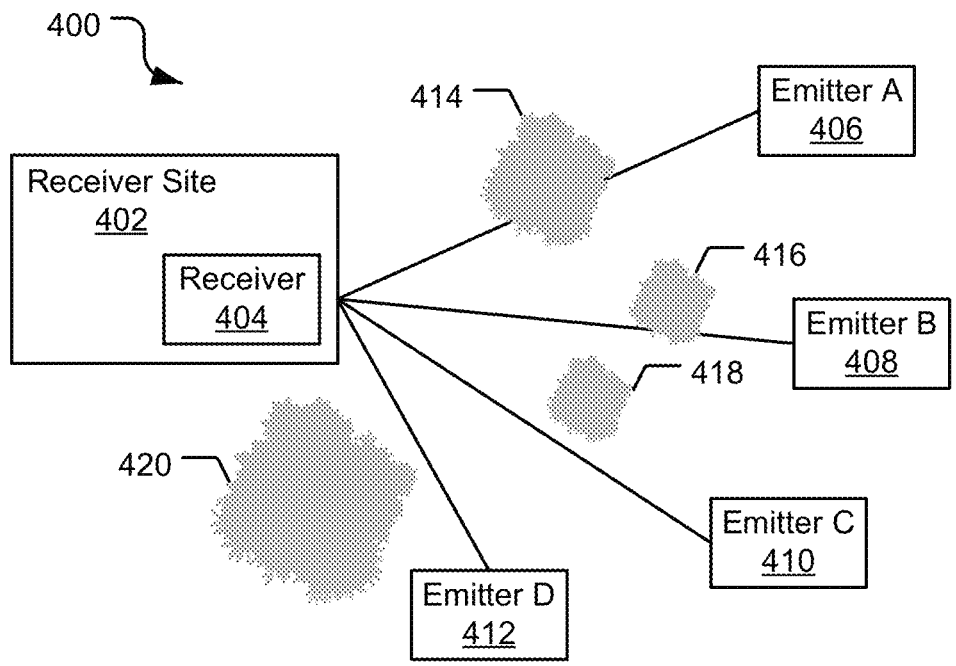
FIG. 4A is a schematic diagram of an outside field-test configuration for obtaining channel sounding measurements of a wireless communication in accordance with one embodiment.

Beginning in operation 302, in-field test equipment may be set-up and/or configured to conduct an in-field test for the given environment. The environment for the in-field may be any environment, such as an outside-to-inside (O2I) environment, an outside-to-outside (O2O) environment, an inside-to-outside (I2O) environment, or an inside-to-inside (I2I) environment. In general, any environment through which the wireless signals to be tested or analyzed may propagate may include in-field test equipment. One particular example of an in-field test environment is illustrated in FIG. 4A, which shows an O2I environment 400 and field-test setup for obtaining channel sounding measurements of a wireless communication. The O2I environment 400 includes a structure which houses a receiver 404. This receiver site 402 may be a house or office building in which a receiver 404 is located and receives wireless signals from one or more emitters 407-412 located outside the receiver site. For example, the receiver site 402 may be a house that includes a wireless Internet receiver 404 for which one or more wireless Internet emitters may transmit a wireless signal to provide Internet service to devices within the receiver site. In general, however, the receiver site 402 may be any type of structure into which a wireless signal propagates.

The O2I environment 400 may also include one or more emitters 406-412 of a wireless signal intended for receipt at the receiver 404. In the example shown, the environment 400 includes emitter A 406, emitter B 408, emitter C 410, and emitter D 412. In some environments 400, a single emitter device may be used and the emitters 406-412 of FIG. 4A indicate possible locations for the emitter for different tests of the wireless system. In other environments, more than one emitter may be utilized for testing. In general, the emitter device 406-412, regardless of the location in the environment 400, may be configured with parameters to emit a wireless signal intended for the receiver 404. The receiver 404 may be similarly configured with parameters to scan for and receive the emitted wireless signal. The one or more emitters 406-412 may be configured to emit a wireless signal that corresponds to one or more wireless signal protocols or standards. For example, the one or more emitters 406-412 may be configured to emit a 5G wireless signal and, in some instances, may be oriented within the environment 400 to direct the emitted signal to the receiver 404 within the receiver site 402. The receiver 404 may also be configured to receive the wireless signal emitted by the one or more emitters 406-412.

Figure 4B:
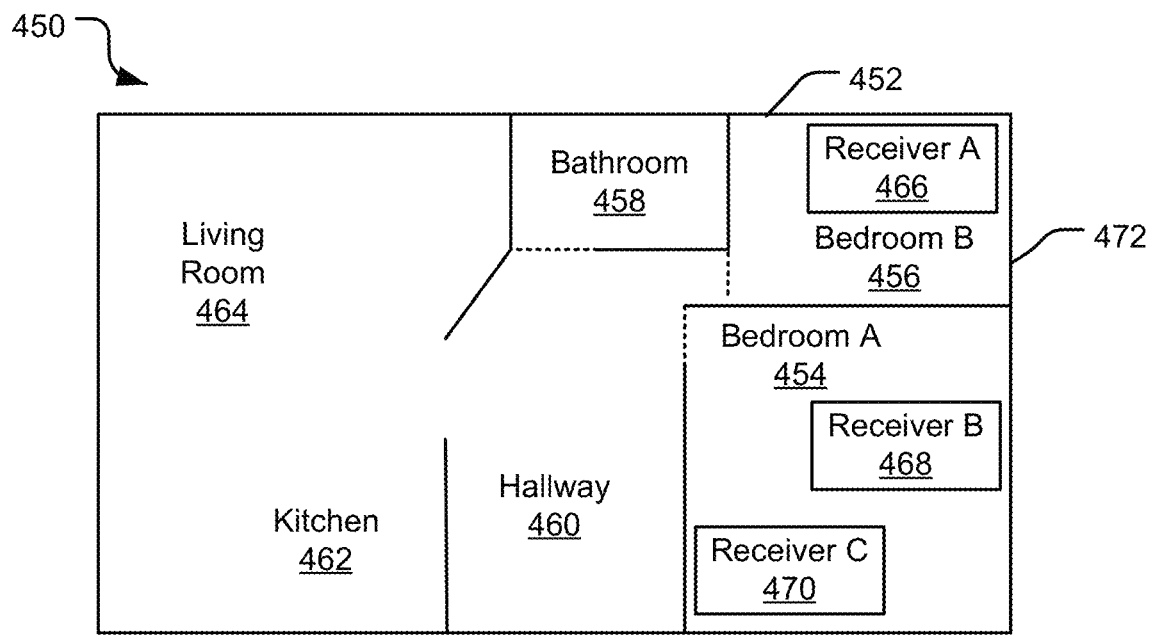
FIG. 4B is a schematic diagram of an inside field-test configuration for obtaining channel sounding measurements of a wireless communication in accordance with one embodiment.

FIG. 4B is a schematic diagram of an inside field-test setup for obtaining channel sounding measurements of a wireless communication. More particularly, the diagram illustrates a floorplan 450 of a floor of the receiver site 402 discussed above with reference to FIG. 4A. In the example illustrated, the receiver site 402 is a home such that the floor plan 450 may include several rooms (living room 464, kitchen 462, bathroom 458, hallway 460, bedroom A 454, and bedroom B 456. In instances in which the receiver site 402 is an office building, the floor plan 450 may include one or more offices. Regardless, the floorplan 450 includes one or more receivers 466-470 located within the receiver site 402 for receiving an emitted wireless signal. In the illustrated floor plan 450, three receivers 466-470 are located along or near an east wall 472 through which the one or more emitted wireless signals may penetrate into the receiver site 402. Similar to above, the receiver site 402 may include one receiver and the illustrated receivers 466-470 within the floorplan 450 may be available locations for the receiver for different wireless tests. For example, the receiver may be located in receiver A location 466 for a first test, in receiver B location 468 for a second test, and receiver C location 470 for a third test.

Different locations for the one or more receivers 466-470 and/or the one or more emitters 406-412 may be selected based on conditions of the environment. For example, a tree 414 may be located along the propagation path from emitter A 406 location to receiver 404. Propagation through the tree 414 may attenuate or otherwise scatter the wireless signal. Bush 416 may provide a similar effect on wireless signals emitted from emitter B 408 location to receiver 404. In addition, transmission paths may be near a tree or other vegetation such that windy conditions may cause the tree or bush to interfere with the transmitted wireless signal. Similarly, conditions of the receiver site 402 may affect the strength of the wireless signal received at the receiver. For example, the structure of the east wall 472 may attenuate the wireless signal, such as if the wireless signals propagate through a window, a wood frame, and/or brick. Thus, a receiver located in receiver A 466 location may receive an attenuated signal if no window is present on the east wall 472 within bedroom B 456, but may receive higher signal power if the receiver is located in receiver B location 468 behind a window of the east wall. The locations of the one or more emitters 406-412 in the outside environment and the one or more receivers 466-470 in the inner environment may therefore be selected to obtain in-field measurements of various environmental conditions.

Figure 5A:
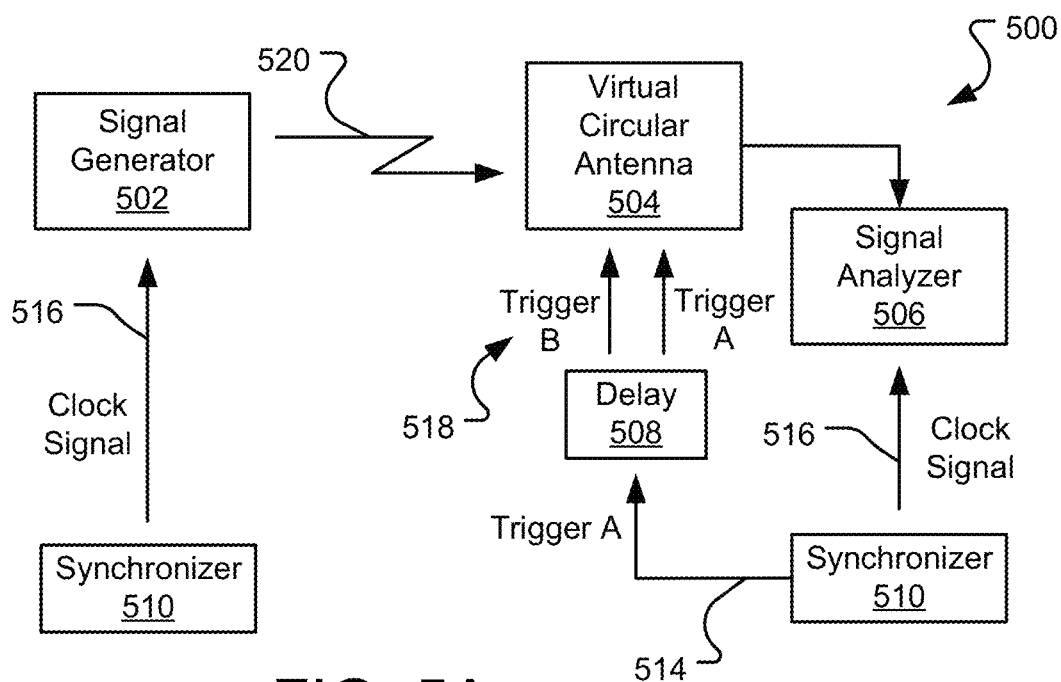
FIG. 5A is a block diagram of a first in-field testing configuration for obtaining channel sounding measurements of a wireless communication in accordance with one embodiment.

FIG. 5A is a block diagram of a first in-field testing set-up 500 for obtaining channel sounding measurements of a wireless communication in accordance with one embodiment. The testing set-up 500 may include an emitter (also referred to as a signal generator 502) similar to that described above with reference to FIG. 4A. The signal generator 502 may be configured to generate a wireless signal 520 corresponding to a wireless communication system and/or signaling protocol. For example, the wireless signal 520 may be a 5G wireless signal for use in 5G wireless communication networks. The wireless signal 520 may be of any frequency used for a wireless communications network. Some particular implementations may utilize a 0.5 GHz signal, 4 GHz signal, 5 GHz signal, up to a 100 GHz signal. The wireless signal 520 may be transmitted through the environment (such as an outside environment 400 of FIG. 4A) by an emitter antenna connected to the signal generator. The wireless signal 520 may be received by circular antenna array 504 and communicated to a receiver (also known as a signal analyzer 506). The signal analyzer 506 may analyze, log, store, process, etc. the wireless signal 520 for analysis by a computing device to determine parameters of the wireless signal. For example, the signal analyzer 506 (or a computing device in communication with the signal analyzer) may generate a plot of signal parameters of the received wireless signal, such as a power delay profile for the wireless signal. The computing device may construct other parameters or characteristics of the wireless signal 520, such as amplitude, delay, power profiles, loss models, and the like. The potential analysis and characteristics of the received wireless signal generated by the computing device are discussed in more detail below.

In one particular implementation, the signal generator 502 (and corresponding signal emitting antenna) may be located in the outside environment 400 of FIG. 4A at one of emitter location A 406, emitter location B 408, emitter location C 410, and/or emitter location D 412. Circular antenna array 504 and/or signal analyzer 506 may be located in the inner environment 450 of FIG. 4B at receiver location A 466, receiver location B 468, or receiver location C 470. Once the signal generator 502 and/or the signal analyzer 506 are at a desired location within the in-field testing site, one or more tests of a wireless signal may be conducted, as explained in more detail below. The testing set-up 500 may also include a synchronizer 510 and a delay device 508 for generating synchronized signals used for testing the wireless system, such as a clock signal 516, trigger A signal 514 and trigger B signal 518. The clock signal 516 may be provided by the synchronizers 510 to the signal generator 502 and the signal analyzer 506 such that a transmission delay of the wireless signal 520 may be calculated by the signal analyzer 506 or computing device. The use of triggers for conducting a test of the wireless signal, and in particular for conducting a MIMO channel sounding measurement of the wireless signal 520 is described below.

Returning to the method 300 of FIG. 3, a testing device may determine if the emitted wireless signal is detected or received at the VCA 504 in operation 304. If the emitted wireless signal is not detected, the components of the in-field testing configuration may be adjusted until the wireless signal is detected. If the signal is detected, a first set of measurements may be obtained through the testing set-up 500 using a first trigger signal in operation 306. In particular, the testing set-up may be controlled to provide one or more trigger signals 514, 518 for obtaining measurements of the wireless signal 520. Through the use of the trigger signals 514, 518 and a virtual circular antenna array device, one or more measurements of a MIMO wireless signal may be obtained or estimated. For example, virtual circular antenna 504 of testing set-up 500 may be controlled to obtain wireless signal measurements based on a first trigger (trigger A 514) and based on a second trigger (trigger B 518) occurring 2*wavelength of the wireless signal. The 2*wavelength measurements may be equivalent to a second MIMO non-coherent channel sounding measurement to approximate a MIMO measurement with a single antenna device 504.

Figure 6A:
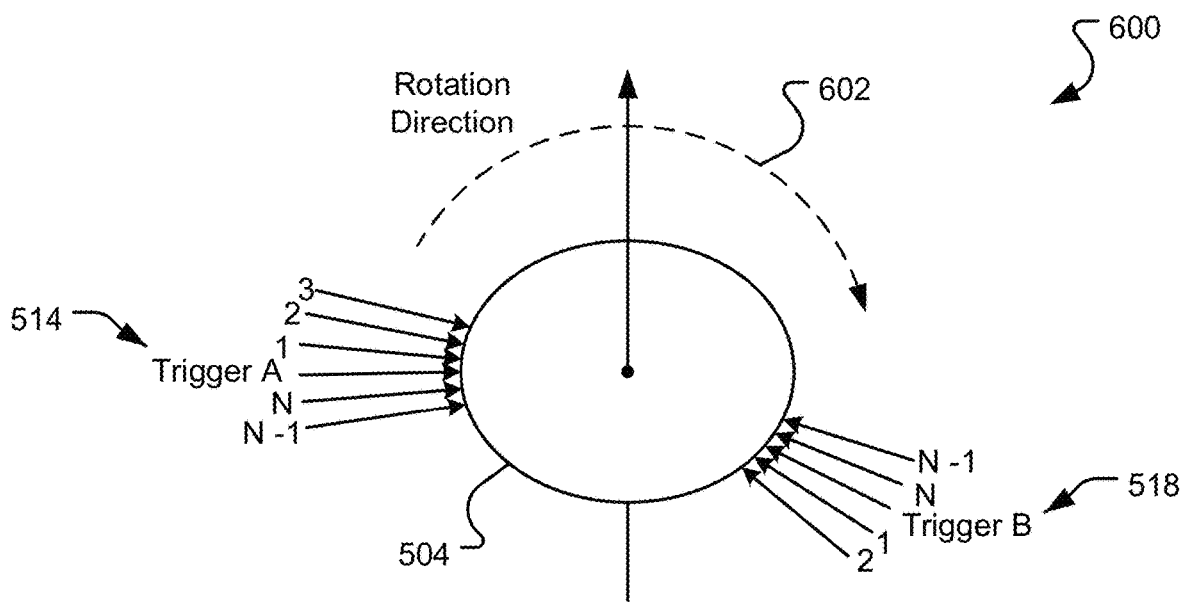
FIG. 6A is a diagram of a virtual circular antenna of the first or second in-field testing configuration for obtaining channel sounding measurements of a wireless communication in accordance with one embodiment.
Figure 6B:
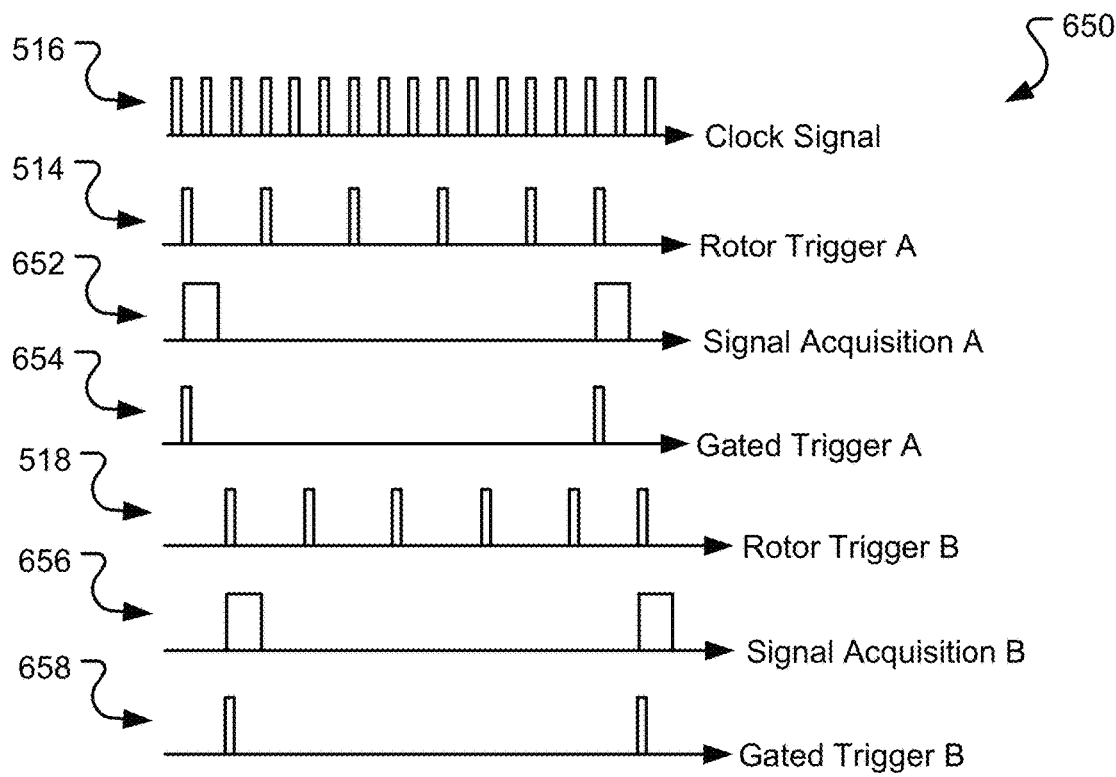
FIG. 6B is a timing diagram of several control signals for controlling the virtual circular antenna to obtain channel sounding measurements of a wireless communication in accordance with one embodiment.

FIG. 6A is a diagram 600 of the virtual circular antenna 504 of the in-field testing set-up 500 that may be controlled to obtain MIMO channel sounding measurements of a wireless communication. FIG. 6B illustrates a timing diagram 650 of several control signals for controlling the virtual circular antenna 504 to obtain the MIMO channel sounding measurements of a wireless communication. Other types of receiving antennas may be utilized with testing set-up 500 and may be controlled with different control signals than depicted in the timing diagram 650. Rather, the virtual circular antenna 504 and control signals 650 are but one example of a method of controlling a receiving antenna to obtain estimated or equivalent MIMO channel sounding measurement of a wireless signal 520.

In one implementation, the virtual circular antenna (VCA) 504 may emulate a circular antenna array of N antenna elements by rotating through N positions and obtaining an amplitude and/or phase measurement of the wireless signal 520 to mimic a small change in position of a receive antenna during testing of the wireless system set-up 500. In one particular implementation, the VCA 504 may cycle through 1000 positions around an axis over 1 second to obtain 1000 channel sounding readings of the wireless signal 520. In the VCA 504 illustrated in FIG. 6A, the antenna may receive a first trigger signal (Trigger A 514) to begin collecting the N measurements of the wireless signal 520 as the antenna rotates in the rotation direction 602 for 360 degrees in a circle. In other words, the trigger A signal 514 indicates the point in the rotation of the VCA 504 at which measurements of the wireless signal 520 may begin to be obtained. As shown in the testing set-up 500, trigger A 514 may be provided by synchronizer 510 to the VCA 504 through delay device 508, which in this instance does not delay the trigger signal. Other devices may also provide trigger A 514, such as a testing control computing device in communication with the delay device 508. Upon receiving the trigger A signal 514, the VCA 504 may continue rotating in a first direction 602 to a first position (noted in FIG. 6A as location 1) and obtain a measurement of the wireless signal 520. Based on a testing duration of the VCA 504, which may also be configurable, the VCA may rotate to a second location (noted as location 2) and again obtain a measurement of the wireless signal 520. The VCA 504 may continue to rotate in the rotation direction 602 around the circular antenna for N number of positions, such as over 1000 positions, although more or fewer measurement positions may be implemented through the VCA. After obtaining a measurement of the wireless signal 520 at position N, the VCA 504 may cease measurement of the wireless signal 520 and await another trigger A signal 514 from the delay device 508 or may continue rotating around the circular array obtaining measurements until a stop signal is received.

FIG. 6B illustrates the control signals 650 utilized to control the VCA 504 to obtain the measurements of the wireless signal 520. In particular, the timing signals include a clock signal 516 that may be provided by the synchronizer 510 to the signal generator 502 and/or the signal analyzer 506. The synchronizer 510 may also provide the trigger A signal 514 to the delay device 508, which may in turn provide the trigger A signal to the VCA 504. Alternatively, trigger A 514 may be provided to the VCA 504 directly from the synchronizer 510 or from another computing device in communication with the VCA. The synchronizer 510 or another computing device may also provide the trigger A signal 514 to the VCA. As shown in the timing diagram 650 of FIG. 6B, trigger A 514 may or may not be coherent or synchronous with the clock signal 516. Regardless, the trigger A signal 514 may start the VCA 504 to begin obtaining measurements of the wireless signal 520, as explained above. Additional signals may also be used to control other components of the testing set-up 500, such as wireless signal acquisition A signal 652 to control the signal analyzer 506 to obtain, store, and/or analyze the measurements received at the VCA 504. In some instances, the wireless signal acquisition A signal 652 may occur at the same time as trigger A 514 with a longer duration to ensure the wireless signal 520 received at the VCA is obtained by the signal analyzer 506. A gated trigger signal 654 provides a sum of the trigger A signal 514 and the wireless signal acquisition A signal 652. It should be appreciated that other timing signals 650 may be used to control the components of the in-field testing set-up 500.

Through the use of the trigger A signal 514, a single input, single output (SISO) channel sounding measurement of the wireless signal 520 may be obtained. However, the VCA 504 may also be configured or controlled to obtain an equivalent MIMO channel sounding measurement of the wireless signal 520 without the need of a separate testing set-up introducing uncertainties or variables into the wireless signal measurements. In particular and as illustrated as step 308 of the method 300 of FIG. 3, a testing device may determine if a MIMO channel sounding measurement of the wireless signal is to be emulated. If a MIMO channel of the wireless signal is to be emulated, a second set of measurements of the wireless signal may be obtained using the testing set-up 500 of FIG. 5A at operation 310. The second set of measurements of the wireless signal 520 may be based, in some instances, on a second trigger signal different than the first trigger signal. For example, the delay device 508 of the testing set-up 500 may delay the trigger signal 514 provided by the synchronizer 510 or other computing device to generate a second trigger signal, also referred to herein as the trigger B signal 518. In one particular implementation, the delay device 508 may delay the trigger A signal 514 by 2*wavelength of the wireless signal 520. For example, the delay device may delay the trigger signal by 3.35 ms for a 28 GHz wireless signal 520. In general, however, the delay difference between trigger A 514 and trigger B 518 may be any value as controlled by the delay device or other computing device and may or may not be based on the wavelength of the wireless signal 520.

Returning to FIG. 6A, the trigger B signal 518 occurs at a different location on the rotation of the VCA 504 than the trigger A signal 514. Similar to the operation of the VCA 504 following the trigger A signal 514, the VCA may continue rotating to a first position (illustrated as position "1" following the trigger B signal) and obtain a channel sounding measurement of the wireless signal 520. The VCA 504 may continue rotating in the rotation direction 602 in a 360 degree circle obtaining N number of measurements of the wireless signal 520. Similar to above, the VCA 504 may be configured to obtain 1000 measurements during the rotation of the antenna from trigger B location 518, although the VCA may be configured to obtain any number of measurements. As shown in the timing diagram 650 of FIG. 6B, trigger B 518 may be time synchronized with trigger A 514, such as being delayed by 2*wavelength of the wireless signal 520 from the trigger A signal. For example, trigger B may be delayed by 15.63 ms for a 6 GHz wireless signal, 3.35 ms for a 28 GHz signal, 2.40 ms for a 39 GHz signal, etc. Additional control signals for obtaining the second measurements are also illustrated in the timing diagram 650 of FIG. 6B. For example, a wireless signal acquisition B signal 656 may be used and transmitted to control the signal analyzer 506 to obtain, store, and/or analyze the measurements received at the VCA 504 during the second measurement period of the wireless system testing. In some instances, the wireless signal acquisition B signal 656 may occur at the same time as trigger B 518 with a longer duration to ensure the wireless signal 520 received at the VCA is obtained by the signal analyzer 506. A gated trigger signal 658 provides a sum of the trigger B signal 518 and the wireless signal acquisition B signal 656.

Through the processes and systems described above, the testing set-up 500 may obtain first and second measurements of a wireless signal 520 that may be combined to approximate a MIMO channel sounding measurement of the wireless signal. In particular, the signal generator 502 may generate and transmit (perhaps through an emitter antenna) a wireless signal through an environment 400, such as an O2I environment. The wireless signal 520 may be received by VCA 504 located within a receiver site 402. The VCA 504 may obtain measurements of the wireless signal 520 based on a trigger signal and provide such measurements to a signal analyzer 506 that is synchronized with the signal generator 502. In one implementation of the testing procedure, a first trigger signal (trigger A 514) may be transmitted to the VCA 504 and/or the signal analyzer 506 to begin obtaining and logging measurements of the wireless signal 520. The measurements may include any characteristic of the wireless signal, such as an amplitude and phase of the signal. Such measurements may be used to generate a SISO channel sounding profile for the wireless signal 520. At a later time, a second trigger signal (trigger signal B 518) may be transmitted to the VCA 504 and/or the signal analyzer 506 to begin obtaining and logging additional measurements of the wireless signal 520. In some examples, trigger B 518 may be delayed from trigger A 514 by a delay device 508, the delay being at least 2*wavelength of the wireless signal 520. As the starting time and antenna location of the second measurements of the wireless signal 520 are delayed from the starting time and antenna location of the first measurements, the second measurements may approximate a MIMO channel sounding measurement of the wireless signal 520.

Figure 5B:
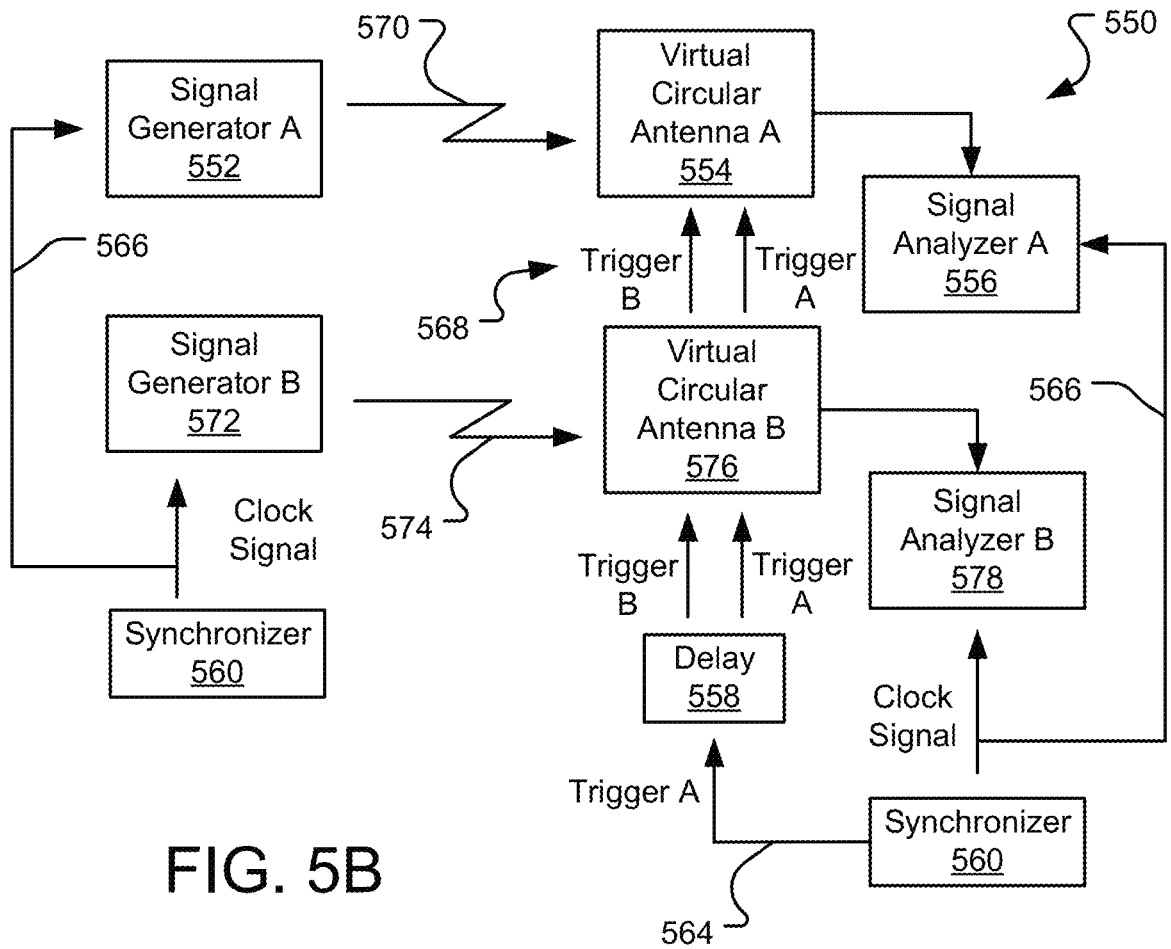
FIG. 5B is a block diagram of a second in-field testing configuration for obtaining channel sounding measurements of a wireless communication in accordance with one embodiment.

FIG. 5B is a block diagram of a second in-field testing set-up 550 for obtaining channel sounding measurements of a wireless communication in accordance with one embodiment. The testing set-up 550 of FIG. 5B provides additional MIMO channel sounding measurements for use in analyzing a wireless communication system. The second testing set-up 550 may include one or more similar devices as described above with reference to FIG. 5A. For example, the testing set-up 550 may include a first signal generator 552 (signal generator A) configured to generate and emit a wireless signal 570, such as a 5G or LTE wireless signal. The wireless signal 570 may be received by a first VCA 554 (virtual circular antenna A) in communication with a first signal analyzer 556 (signal analyzer A). A synchronizer 560 may provide control signals, such as a clock signal and/or measurement trigger signals, to signal generator A 552, VCA A 554, and/or signal analyzer A 556 in a similar manner as described above. In particular, a first trigger signal (trigger A 564) may be transmitted to VCA A 554 to initiate obtaining a first collection of measurements of the wireless signal 570. A second trigger signal (trigger B 568) may be transmitted to VCA A 554 to initiate obtaining a second collection of measurements of the wireless signal 570. The obtained measurements may be utilized to generate a channel sounding profile of the wireless signal 570.

A second set of devices may also be included in the testing set-up 550 and operate in a similar manner as above. For example, the testing set-up 550 may include a second signal generator (signal generator B 572) generating and emitting a second wireless signal 574, a second VCA (VCA B 576) for receiving the second wireless signal, and a second signal analyzer (signal analyzer B 578) in communication with VCA B. As above, signal generator B 572, VCA B 576, and signal analyzer B 578 may receive control signals from the synchronizer 560 and/or delay device 558 to control the obtaining and logging of measurements of the second wireless signal 574. Such signals may include the trigger A signal 564 and the trigger B signal 568. In one particular implementation, signal generator A 552 and signal generator B 572 may be configured and controlled to emit the same or a similar wireless signal such that VCA A 554 and VCA B 576 obtain and log measurements of the same emitted signal. However, in this instance, VCA A 554 and VCA B 576 may be located in different locations so that the wireless signal received at each antenna may represent obtaining the wireless signal at a different location. In one particular implementation, VCA A 554 and VCA B 576 may be separated by at least 2 wavelengths of the wireless signal 570, 574. The measurements of the wireless signal received at the separated VCAs may represent a MIMO channel sounding measurement of the wireless signal as the measurements at VCA B 576 may represent or be equivalent to a reflected wireless signal to approximate the MIMO wireless signal. In this implementation, the trigger A signal 564 and the trigger B signal 568 may operate in a similar manner as described above for both VCA A 554 and VCA B 576.

Returning to the method 300 of FIG. 3, one or more characteristics of the wireless signal may be determined from the collected or obtained measurements through the testing set-up 500 of FIG. 5A and/or testing set-up 550 of FIG. 5B in operation 312. In one implementation, the characteristic may include a power delay profile (PDP) of the wireless signal based on the MIMO channel sounding measurements obtained as described above. Additional or alternative wireless signal characteristics may also be determined, such as amplitude change over time, phase change over time, channel impulse response, angular power profiles, cumulative distribution function of root mean square versus angular spread for different profiles, instantaneous power delay profile, average power delay profile, and/or local path loss models. In general, any characteristic of the wireless signal, either SISO or MIMO type signals, may be generated from the wireless signal measurements obtained through the method 300 of FIG. 3.

Figure 7:
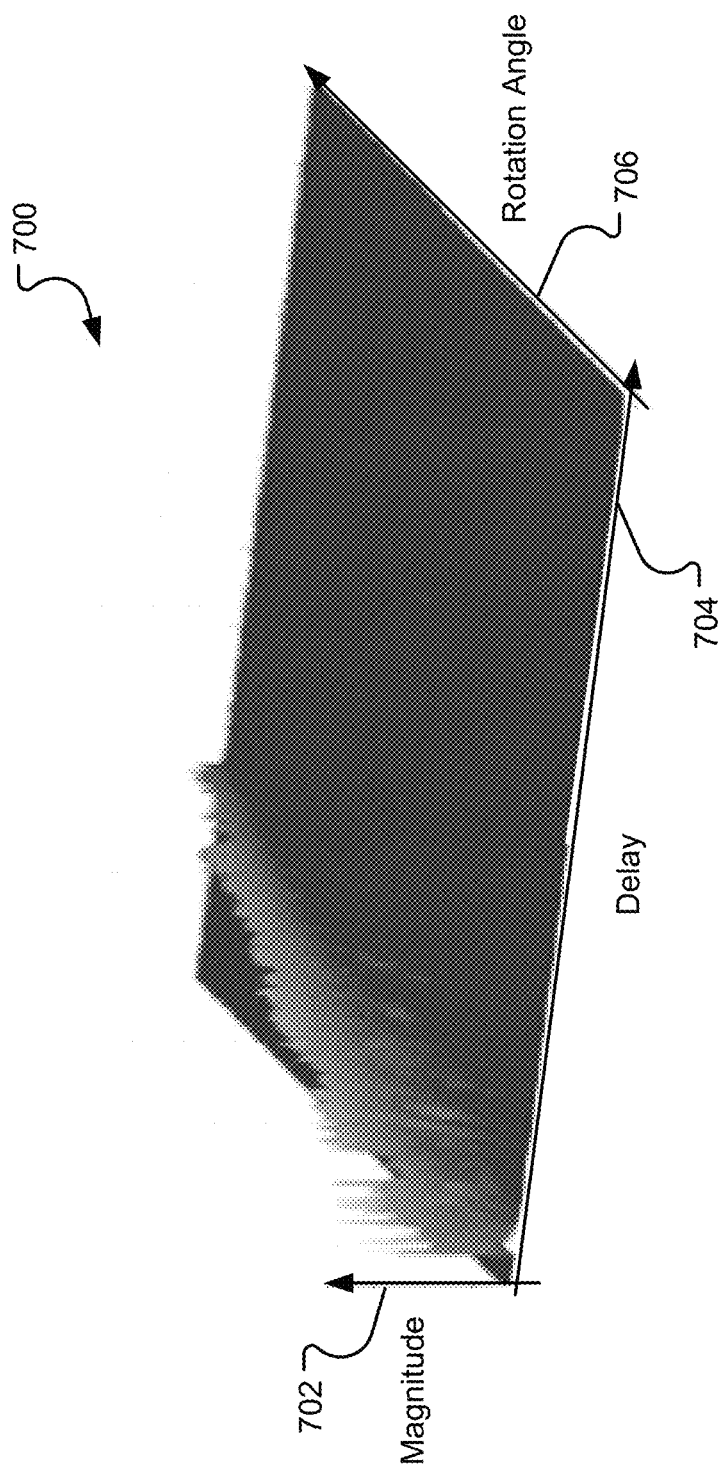
FIG. 7 is a power delay profile plot based on in-field channel sounding measurements of a wireless communication in accordance with one embodiment.

FIG. 7 is an example power delay profile plot 700 based on in-field channel sounding measurements of a wireless communication in accordance with one embodiment. The plot 700 may be based on data obtained during in-field testing of a wireless system as described above to approximate MIMO channel sounding measurements of a wireless signal. The illustrated plot 700 is a three-dimensional plot of power measurements of a wireless signal obtained through the methods and systems above. The plot illustrates measured magnitude of the power of the wireless signal along the z-axis 702, a measured delay 704 of receipt of the wireless signal at the receiver(s) of the testing set-up along an x-axis 704 based on the synchronized clock signal, and a measured rotation angle of the received wireless signal along the y-axis 706 to generate the PDP of the wireless signal 520. Again, the PDP plot 700 is but one potential characteristic of the wireless signal that may be generated from the measurements obtained through the processes and systems described herein.

Figure 8:
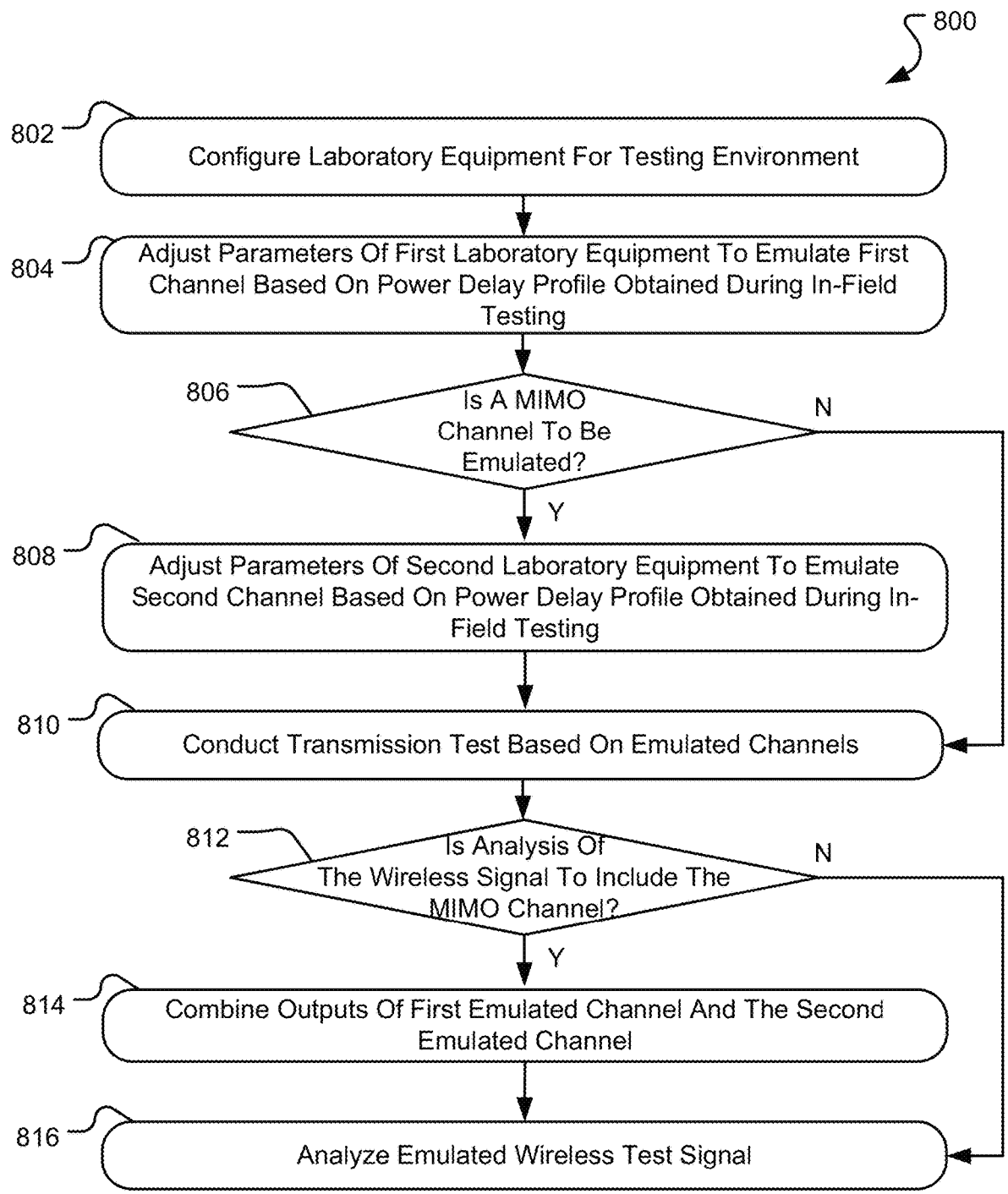
FIG. 8 is a flowchart of a method for conducting laboratory evaluation of a wireless communication propagation in a laboratory setting using an emulated communication channel in accordance with one embodiment.

The characteristics obtained from the in-field testing may be used in a laboratory environment to emulate the conditions of the in-field testing, including emulated MIMO channel measurements, for evaluating the SISO and/or MIMO performance of the wireless communication system. FIG. 8 is a flowchart of one method 800 for conducting laboratory evaluation of a wireless communication propagation in a laboratory setting using an emulated communication channel in accordance with one embodiment. In some implementations, one or more of the operations of the method 800 may be performed by a computing device through execution a software program, one or more hardware components configured to perform the operation, or a combination of hardware and software components.

Figure 9A:
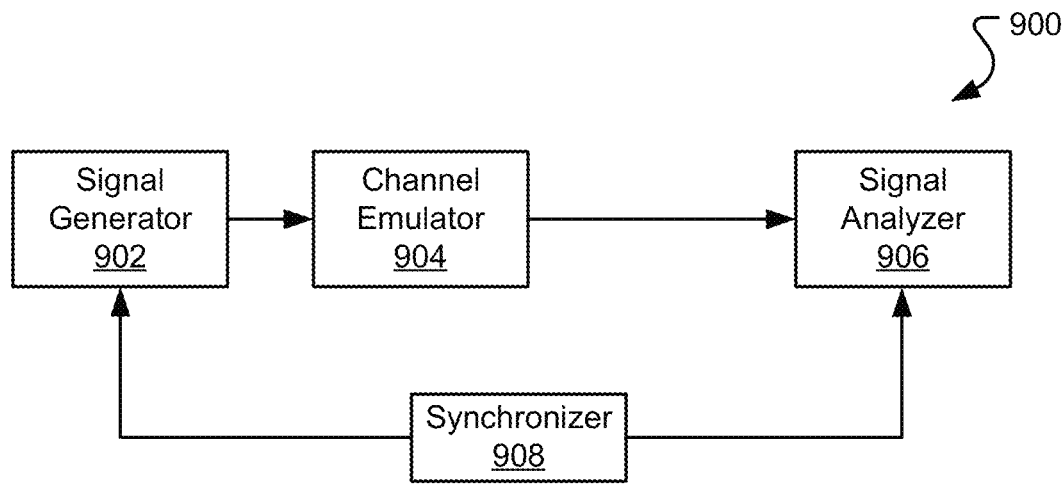
FIG. 9A is a block diagram of a first laboratory testing configuration for evaluating a wireless communication propagation using an emulated communication channel in accordance with one embodiment.

Beginning in operation 802, one or more laboratory devices, components, and/or systems may be configured for testing of a wireless communication system utilizing an emulated wireless channel. FIG. 9A illustrates a block diagram of a first laboratory testing configuration 900 for evaluating a wireless communication propagation using an emulated communication channel in accordance with one embodiment. In one implementation, the first laboratory testing configuration 900 may be utilized to evaluate a SISO wireless communication channel based on the in-field measurements obtained through the processes and systems described above. The first laboratory testing configuration 900 may include a signal generator 902 configured to generate a wireless communication signal for evaluation. For example, the signal generator 902 may be configured to emit the same or similar wireless signal 520 as used during the in-field testing of the wireless system and may be of any wireless signaling protocol, such as 5G and/or LTE.

The generated wireless signal may be transmitted to a channel emulator 904 in electrical communication with the signal generator 902. As described in more detail below, the channel emulator 904 may receive one or more determined characteristics of the in-field wireless signal as calculated from the obtained measurements of the in-field wireless signal. In one particular example, the channel emulator 904 may be configured based on the power delay profile of the in-field wireless signal calculated from the measurements obtained during the in-field testing. The channel emulator 904 may alter the generated wireless signal from the signal generator 902 to emulate the in-field conditions as measured during the in-field testing. Upon altering, the generated wireless signal may be transmitted to a signal analyzer 906 for logging, analysis, and/or measurements of characteristics of the altered wireless signal. In general, the signal analyzer 906 may obtain any measurement or analysis of the altered wireless signal to evaluate the performance of a wireless system, device, or signal. The signal generator 902 and the signal analyzer 906 may be synchronized, in some instances through a synchronized clock signal, by synchronizer 908 such that the signal analyzer may determine propagation delay and other timed measurements of the wireless signal.

Figure 9B:
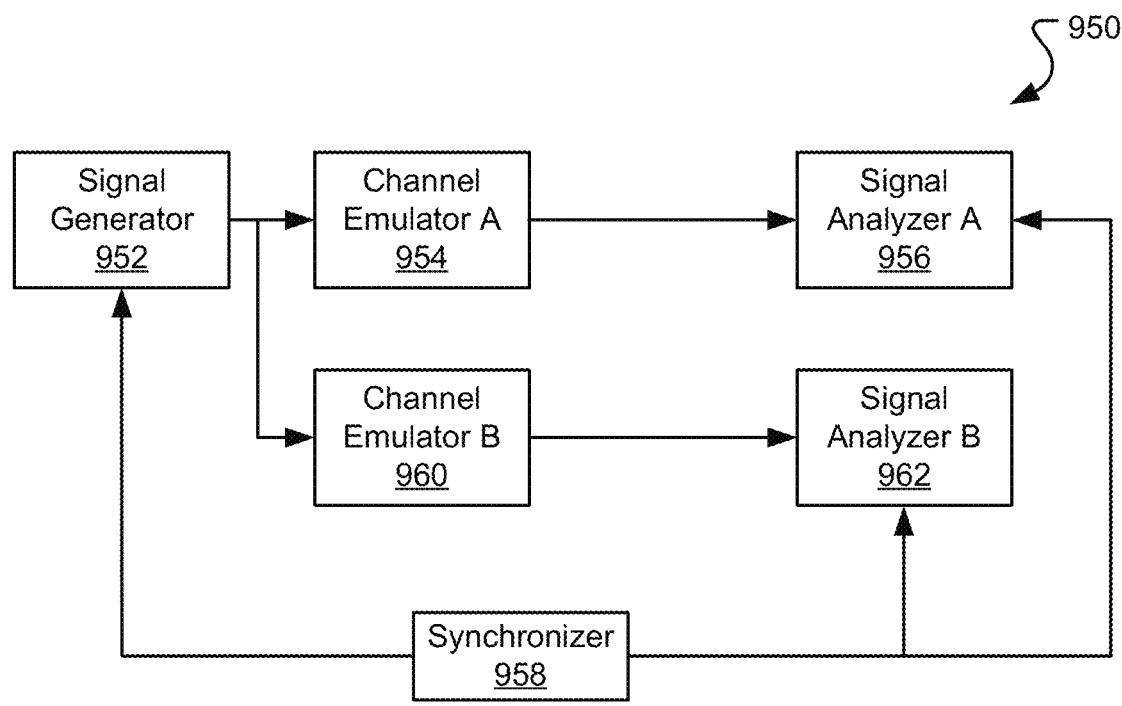
FIG. 9B is a block diagram of a second laboratory testing configuration for evaluating a wireless communication propagation using an emulated communication channel in accordance with one embodiment.

In general, the testing configuration 900 of FIG. 9A may be used to evaluate a wireless signal through emulation of a SISO wireless channel. For evaluation of a wireless signal through emulation of a MIMO wireless channel, the testing configuration 950 illustrated in FIG. 9B may be utilized. Similar to above, the testing configuration 950 of FIG. 9B may include a signal generator 952 for generating a wireless signal that mirrors or approximates the in-field wireless signal. The generated wireless signal may be transmitted to a first channel emulator (channel emulator A 954) and a second channel emulator (channel emulator B 960). Each of the channel emulator 954, 960 may be configured to emulate a wireless channel based on the measurements obtained during the in-field testing. In one implementation, channel emulator A 954 may be configured based on measurements obtained during trigger A 514 testing and channel emulator B 960 may be configured based on measurements obtained during trigger B 518 testing. A first signal analyzer (signal analyzer A 956) may be in communication with channel emulator A 954 to receive and analyze the altered wireless signal from the channel emulator. Similarly, a second signal analyzer (signal analyzer B 962) may be in communication with channel emulator B 960 to receive and analyze the altered wireless signal from the channel emulator. A synchronizer 958 may provide a synchronizing signal to the signal generator 952 and both the signal analyzer A 956 and the signal analyzer B 962. As mentioned, this dual-emulator configuration may be utilized to evaluate a wireless system, device, or signal through an emulated MIMO wireless channel, as explained in more detail below.

Returning to the method 800 of FIG. 8, one or more parameters of the laboratory configuration may be adjusted to emulate a wireless channel or channels based on the measurements obtained during the in-field testing of the wireless system in operation 804. In one particular example, a power delay profile of the wireless signal calculated from the SISO channel sounding measurements obtained as described above may be used to adjust the parameters of the laboratory equipment to emulate a SISO channel for the wireless signal. In addition, MIMO channel sounding measurements may also be used to emulate a MIMO channel for the wireless signal. Thus, in operation 806, it may be determined if a MIMO channel is to be emulated. If yes, one or more parameters of a second channel emulator may be adjusted in operation 808. In one particular example, a power delay profile of the wireless signal calculated from the MIMO channel sounding measurements obtained as described above may be used to adjust the parameters of the laboratory equipment to emulate a MIMO channel for the wireless signal. In general, however, any obtained or derived measurement of the in-field wireless signal may be used to adjust the parameters of the laboratory equipment to emulate a wireless channel, either SISO or MIMO channel.

The channel emulator device of the laboratory equipment configurations 900, 950 may include one or more parameters that are adjustable to emulate a wireless channel for testing of a wireless signal. For example, channel emulator 904 may include adjustable parameters that emulate the power delay profile of a wireless signal as measured in the in-field testing environment. In one implementation, the various measurements that are included in the power delay profile (amplitude, delay, rotation angle, etc.) may be provided as input to the channel emulator, such as through an input file. The channel emulator 904 may transform the input file of measurements into parameter values and adjust one or more parameters of output ports (also known as "taps") of the channel emulator based on the determined values. In another implementation, the signal generator 902 may include a similar functionality as the channel emulator such that the input file may be provided to the signal generator device and one or more output ports of the signal generator may be adjusted according to the input file such that the channel emulator may be integrated within the signal generator. In this manner, the measurements obtained during the in-field testing described above may be utilized to generate an emulated wireless channel for in-lab testing of the wireless signal.

The obtained in-field measurements may be used to adjust the parameters of the channel emulator 904 of the testing configuration 900 of FIG. 9A to emulate a SISO channel of the in-field wireless signal. Alternatively, the obtained in-field measurements may be used to adjust the parameters of channel emulator A 954 and/or channel emulator B 960 to emulate a MIMO channel of the in-field wireless signal. In one implementation, wireless signal characteristics (such as a PDP of the wireless signal) obtained at a first time based on the trigger A signal 514 may be transformed into port parameter values and used to alter one or more parameters of channel emulator A 954. Wireless signal characteristics (such as a PDP of the wireless signal) obtained at a second time based on the trigger B signal 518 may be transformed into port parameter values and used to alter one or more parameters of channel emulator B 960. Upon adjustment of the parameters of the channel emulators, a transmission test of the wireless signal may be conducted on the testing configuration to measure system and signal performance in operation 810 of the method 800 of FIG. 8.

At operation 812, it may be determined if the analysis of the testing wireless signal is to include a MIMO channel component. If yes, the outputs from the emulated first channel and the emulated second channel may be combined in operation 814 for analysis by a signal analyzer or computing device in communication with the signal analyzer. The combined signal or other emulated output signal may be analyzed in operation 816 to determine one or more characteristics of the signal under test. Through an analysis of the altered wireless signal utilizing the channel emulator A 954 and channel emulator B 960, an evaluation of an emulated in-field wireless signal may be executed in a laboratory environment in a repeatable and stable manner. In other words, the emulated channels provide an in-field testing environment while removing the uncontrollable variables that occur in long-term, in-field testing due to environmental factors. The emulated in-field testing, including emulated MIMO channels, in the laboratory environment allows for a real-world evaluation of wireless system, devices, protocols, and signals in a reliable and repeatable manner.

Figure 10:
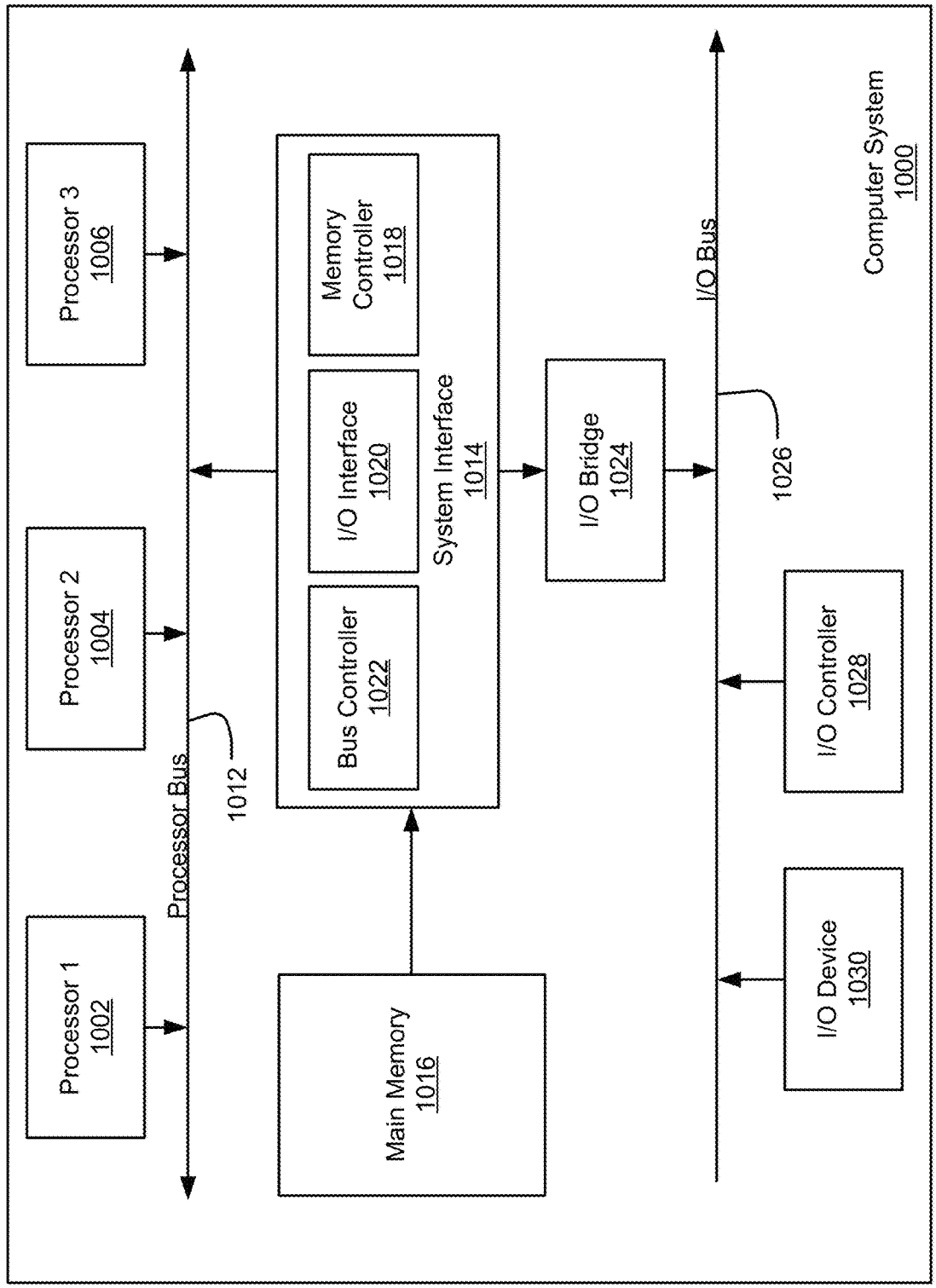
FIG. 10 is a diagram illustrating an example of a computing system which may be used in implementing embodiments of the present disclosure.

FIG. 10 is a block diagram illustrating an example of a computing device or computer system 1000 which may be used in implementing one or more components of the systems or testing configurations disclosed above. For example, the computing system 1000 of FIG. 10 may be the signal analyzer 506 discussed above, among other components. The computer system (system) includes one or more processors 1002-1006. Processors 1002-1006 may include one or more internal levels of cache (not shown) and a bus controller or bus interface unit to direct interaction with the processor bus 1012. Processor bus 1012, also known as the host bus or the front side bus, may be used to couple the processors 1002-1006 with the system interface 1014. System interface 1014 may be connected to the processor bus 1012 to interface other components of the system 1000 with the processor bus 1012. For example, system interface 1014 may include a memory controller 1018 for interfacing a main memory 1016 with the processor bus 1012. The main memory 1016 typically includes one or more memory cards and a control circuit (not shown). System interface 1014 may also include an input/output (I/O) interface 1020 to interface one or more I/O bridges or I/O devices with the processor bus 1012. One or more I/O controllers and/or I/O devices may be connected with the I/O bus 1026, such as I/O controller 1028 and I/O device 1030, as illustrated.

I/O device 1030 may also include an input device (not shown), such as an alphanumeric input device, including alphanumeric and other keys for communicating information and/or command selections to the processors 1002-1006. Another type of user input device includes cursor control, such as a mouse, a trackball, or cursor direction keys for communicating direction information and command selections to the processors 1002-1006 and for controlling cursor movement on the display device.

System 1000 may include a dynamic storage device, referred to as main memory 1016, or a random access memory (RAM) or other computer-readable devices coupled to the processor bus 1012 for storing information and instructions to be executed by the processors 1002-1006. Main memory 1016 also may be used for storing temporary variables or other intermediate information during execution of instructions by the processors 1002-1006. System 1000 may include a read only memory (ROM) and/or other static storage device coupled to the processor bus 1012 for storing static information and instructions for the processors 1002-1006. The system set forth in FIG. 10 is but one possible example of a computer system that may employ or be configured in accordance with aspects of the present disclosure.

According to one embodiment, the above techniques may be performed by computer system 1000 in response to processor 1004 executing one or more sequences of one or more instructions contained in main memory 1016. These instructions may be read into main memory 1016 from another machine-readable medium, such as a storage device. Execution of the sequences of instructions contained in main memory 1016 may cause processors 1002-1006 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available through a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1006 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 1916, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for emulating a wireless channel for evaluation of a wireless signal, the method comprising:
   transmitting a first trigger signal to obtain a first set of measurements of a wireless signal received at a rotating virtual circular antenna (VCA), the first trigger signal corresponding to a first position of the VCA;
   transmitting a second trigger signal to obtain a second set of measurements of the wireless signal received at the VCA, the second trigger signal corresponding to a second position of the VCA different than the first position;
   configuring, based on the first set of measurements, one or more output port parameters of a first channel emulator and, based on the second set of measurements, one or more output port parameters of a second channel emulator; and
   transmitting an evaluation wireless signal to the first channel emulator and the second channel emulator, the output of the first channel emulator and the second channel emulator comprising an emulated multi-input, multi-output (MIMO) wireless channel.

2. The method of claim 1 wherein a time difference for the VCA to rotate from the first position of the VCA to the second position of the VCA corresponds to at least twice a wavelength of the wireless signal.

3. The method of claim 1, further comprising:
   generating, from the first set of measurements and the second set of measurements, one or more characteristics of the wireless signal; and
   transforming the one or more characteristics of the wireless signal into one or more parameter values of the first channel emulator.

4. The method of claim 3 wherein the one or more characteristics of the wireless signal comprises a power delay profile of the wireless signal.

5. The method of claim 3 wherein transforming the one or more characteristics of the wireless signal comprises generating an input file for the first channel emulator and the second channel emulator.

6. The method of claim 1 wherein the first set of measurements and the second set of measurements are obtained during at least one of an outside-to-inside field test, an outside-to-outside field test, an inside-to-outside field test, or an inside-to-inside field test.

7. The method of claim 1 wherein the first trigger signal and the second trigger signal are asynchronous from the wireless signal.

8. The method of claim 1 wherein the first set of measurements comprise at least one amplitude measurement and at least one phase measurement of the wireless signal.

9. The method of claim 1, further comprising:
   capturing, using a first signal analyzer, a characteristic of a first evaluation wireless signal at an output of the first channel emulator; and
   capturing, using a second signal analyzer, a characteristic of a second evaluation wireless signal at an output of the second channel emulator, wherein a MIMO wireless channel characteristic comprises the characteristic of the first evaluation wireless signal and the characteristic of the second evaluation wireless signal.

10. The method of claim 1 wherein obtaining the first set of measurements of the wireless signal comprising obtaining a channel sounding measurement of the wireless signal received at the VCA.

11. A system for emulating a wireless channel for evaluation of a wireless signal, the system comprising:
   a signal generator emitting a wireless communication signal;
   a virtual circular antenna (VCA) receiving the emitted wireless communication signal;
   a signal analyzer measuring at least one characteristic of the wireless communication signal; and
   a computing device comprising:
      one or more processors; and
      a non-transitory storage device including computer executable instructions that, when executed by the one or more processors, cause the one or more processors to:
         transmit a first trigger signal to obtain a first set of measurements of the wireless communication signal received at the VCA, the first trigger signal corresponding to a first position of the VCA;
         transmit a second trigger signal to obtain a second set of measurements of the wireless communication signal received at the VCA, the second trigger signal corresponding to a second position of the VCA different than the first position; and
         configure, based on the first set of measurements, one or more output port parameters of a first channel emulator and, based on the second set of measurements, one or more output port parameters of a second channel emulator, wherein an output of the first channel emulator and an output of the second channel emulator comprise an emulated multi-input, multi-output (MIMO) wireless channel.

12. The system of claim 11 further comprising:
   a delay device receiving the first trigger signal and delaying the first trigger signal to generate the second trigger signal.

13. The system of claim 12 wherein the delayed difference of the first trigger signal and the second trigger signal corresponds to at least twice a wavelength of the wireless communication signal.

14. The system of claim 11 wherein the computer executable instructions, when executed by the one or more processors, further cause the one or more processors to:
generate a reference clock signal; and
transmit the reference clock signal to the signal generator and the signal analyzer.

15. The system of claim 11 further comprising:
a second signal generator emitting a second wireless communication signal;
a second VCA receiving the second emitted wireless communication signal; and
a second signal analyzer measuring at least one characteristic of the second wireless communication signal.

16. The system of claim 15 wherein the VCA and the second VCA are separated by a distance of at least twice a wavelength of the wireless communication signal.

17. The system of claim 11 wherein the first set of measurements and the second set of measurements are obtained during at least one of an outside-to-inside field test, an outside-to-outside field test, an inside-to-outside field test, or an inside-to-inside field test.

18. The system of claim 11 wherein the computer executable instructions, when executed by the one or more processors, further cause the one or more processors to:
generate, from the first set of measurements and the second set of measurements, one or more characteristics of the wireless signal; and
transform the one or more characteristics of the wireless signal into one or more parameter values of the first channel emulator.

19. The system of claim 18 wherein the one or more characteristics of the wireless signal comprises a power delay profile of the wireless signal.

20. The system of claim 18 wherein the computer executable instructions, when executed by the one or more processors, further cause the one or more processors to:
generating an input file for the first channel emulator and the second channel emulator.

* * * * *